United States Patent
Salmenkaita et al.

(10) Patent No.: US 12,284,086 B2
(45) Date of Patent: Apr. 22, 2025

(54) MANAGEMENT OF PREDICTIVE MODELS OF A COMMUNICATION NETWORK

(71) Applicant: Elisa Oyj, Helsinki (FI)

(72) Inventors: Jukka-Pekka Salmenkaita, Helsinki (FI); Teemu Peltonen, Helsinki (FI)

(73) Assignee: Elisa Oyj, Helsinki (FI)

(*) Notice: Subject to any disclaimer, the term of this patent is extended or adjusted under 35 U.S.C. 154(b) by 582 days.

(21) Appl. No.: 17/772,874

(22) PCT Filed: Oct. 26, 2020

(86) PCT No.: PCT/FI2020/050704
§ 371 (c)(1),
(2) Date: Apr. 28, 2022

(87) PCT Pub. No.: WO2021/089911
PCT Pub. Date: May 14, 2021

(65) Prior Publication Data
US 2022/0376989 A1    Nov. 24, 2022

(30) Foreign Application Priority Data
Nov. 4, 2019 (FI) .................. 20195942

(51) Int. Cl.
*H04L 41/147* (2022.01)
*G05B 23/02* (2006.01)
(Continued)

(52) U.S. Cl.
CPC ........ *H04L 41/147* (2013.01); *G05B 23/0283* (2013.01); *H04L 41/065* (2013.01); *H04L 41/0893* (2013.01); *H04L 41/145* (2013.01)

(58) Field of Classification Search
CPC . H04L 41/065; H04L 41/0893; H04L 41/142; H04L 41/145; H04L 41/147
See application file for complete search history.

(56) References Cited

U.S. PATENT DOCUMENTS

2017/0019291 A1  1/2017  Tapia et al.
2017/0290024 A1  10/2017  Ouyang et al.
(Continued)

FOREIGN PATENT DOCUMENTS

EP    2871803 A1    5/2015

OTHER PUBLICATIONS

Finnish Patent and Registration Office, Search Report, U.S. Appl. No. 20/195,942, mailed Jun. 15, 2020, 2 pages.
(Continued)

*Primary Examiner* — Michael Thier
*Assistant Examiner* — Prince A Mensah
(74) *Attorney, Agent, or Firm* — Ziegler IP Law Group, LLC.

(57) ABSTRACT

A computer implemented method of managing a predictive model of a communication network, wherein the predictive model is configured to identify and correct forthcoming failures in network devices based on data collected from the network devices. The method includes allocating network devices of the communication network into first and second clusters, disabling the predictive model in the first cluster, enabling the predictive model in the second cluster, collecting data from the first cluster, repeating said disabling, enabling and collecting with a new allocation of first and second clusters to continuously collect data with different allocation of first and second clusters, and outputting at least the data collected from the first cluster for analysis of the predictive model.

13 Claims, 3 Drawing Sheets

(51) Int. Cl.
*H04L 41/0631* (2022.01)
*H04L 41/0893* (2022.01)
*H04L 41/14* (2022.01)

(56) References Cited

U.S. PATENT DOCUMENTS

2018/0219889 A1    8/2018  Oliner et al.
2018/0227930 A1*   8/2018  Ouyang .............. H04L 41/0896
2018/0248905 A1    8/2018  Côté et al.
2019/0364433 A1*  11/2019  Das ......................... G06N 5/01

OTHER PUBLICATIONS

International Search Report and Written Opinion of the International Searching Authority, European Patent Office, Application No. PCT/FI2020/050704, mailed Jan. 22, 2021, 15 pages.

* cited by examiner

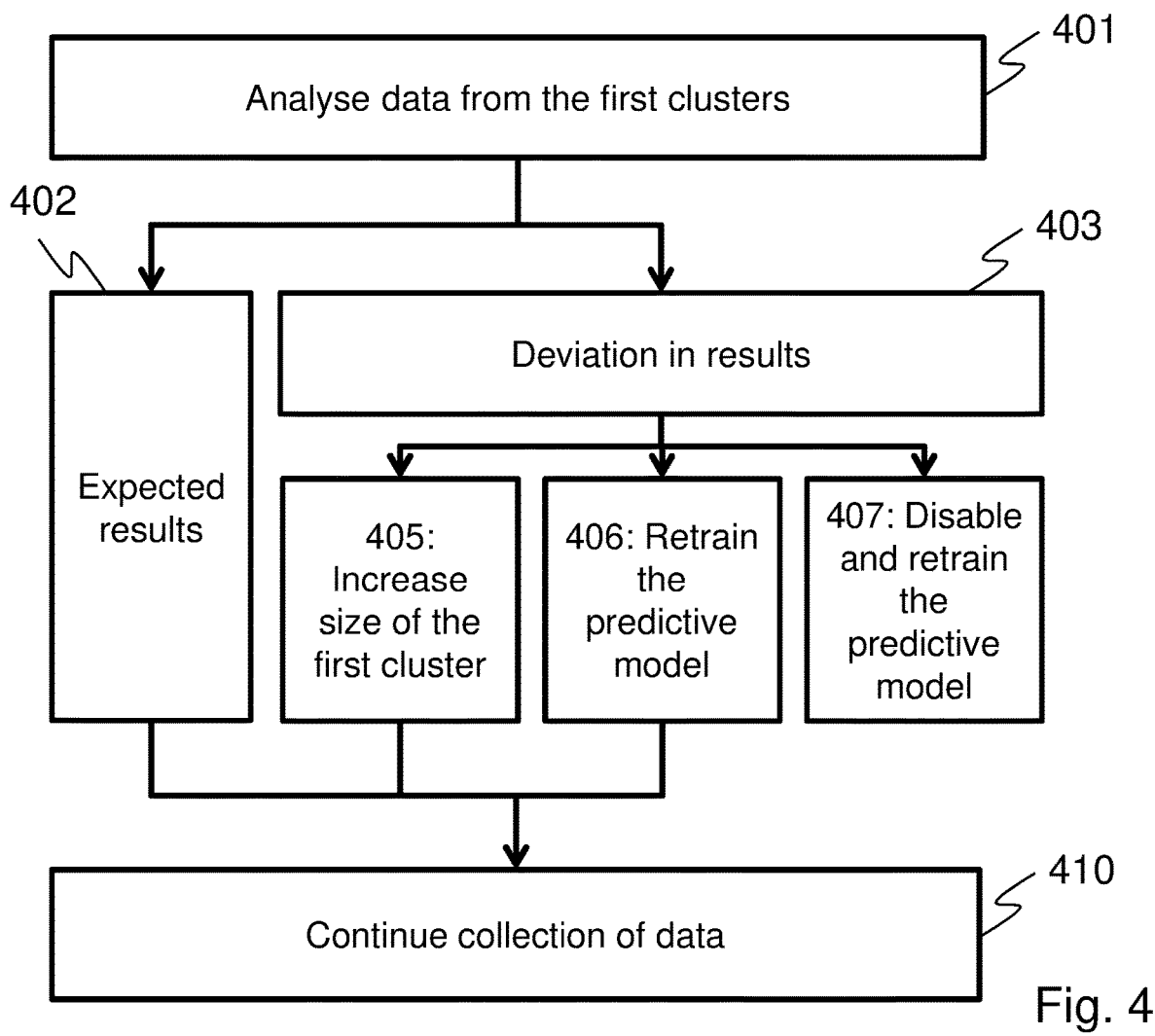

MANAGEMENT OF PREDICTIVE MODELS OF A COMMUNICATION NETWORK

TECHNICAL FIELD

The aspects of the disclosed embodiments generally relate to management of predictive models of a communication network.

BACKGROUND

This section illustrates useful background information without admission of any technique described herein representative of the state of the art.

Communication networks comprise a plurality of cells serving users of the network. Network devices forming the network require constant monitoring and maintenance to fix failures in the network devices in order to ensure quality of service.

Predictive models can be used for identifying and correcting forthcoming failures in network devices before they occur. Based on predicted failures the required corrective actions can be taken beforehand to avoid the predicted failure. A challenge associated with use of predictive models is that in complex systems changes in the system cause model drift and reliability of the predictive model degrades over time. Therefore, it is not always clear whether the predicted failure would have actually occurred even if the corrective action was not taken. That is, it is not known, if the predictive model operates correctly. Periodic re-training and re-evaluation of the predictive model is therefore needed.

SUMMARY

Various aspects of examples of the disclosed embodiments are set out in the claims. Any devices and/or methods in the description and/or drawings which are not covered by the claims are examples useful for understanding the aspects of the disclosed embodiments.

According to a first example aspect of the disclosed embodiments, there is provided a computer implemented method of managing a predictive model of a communication network, wherein the predictive model is configured to identify and correct forthcoming failures in network devices based on data collected from the network devices. The method comprises allocating network devices of the communication network into first and second clusters,
disabling the predictive model in the first cluster,
enabling the predictive model in the second cluster,
collecting data from the first cluster,
repeating said disabling, enabling and collecting with a new allocation of first and second clusters to continuously collect data with different allocation of first and second clusters, and
outputting at least the data collected from the first cluster for analysis of the predictive model.

In an embodiment, the allocation into the first and second clusters is based on at least one of: type of the network devices, technology of the network devices, supplier of the network devices, time, and geographical locations of the network devices.

In an embodiment, the method further comprises collecting data from the second cluster and applying the predictive model to the data collected from the second cluster to identify and correct failures in network devices of the second cluster.

In an embodiment, the method further comprises analyzing the predictive model based on data collected from the first cluster over time.

In an embodiment, the analyzing comprises comparing results of the predictive model applied to current data collected from the first cluster with results of the predictive model applied to earlier data collected from the first cluster.

In an embodiment, the analyzing comprises comparing results of the predictive model applied to data collected from the first cluster with results of the predictive model applied to a validation data set.

In an embodiment, the method further comprises, responsive to detecting deviation from expected results in said analyzing, performing a management action.

In an embodiment, the management action comprises one of the following:
increasing size of the first cluster, and continuing collection of the data from the first clusters,
retraining the predictive model,
retraining the predictive model based on the data collected from the first clusters, and continuing collection of the results from first clusters, and
disabling the predictive model in all network devices, and retraining the predictive model.

In an embodiment, the deviation is an increase in false negatives in the predictive model, and the responsive management action is retraining (406) the predictive model based on the data collected from the first clusters, and continuing collection of the results from first clusters.

In an embodiment, the deviation is an increase in false positives in the predictive model, and the responsive management action is disabling (407) the predictive model in all network devices, and retraining the predictive model.

In an embodiment, a statistically significant deviation is required for retraining the predictive model.

In an embodiment, at least 20% deviation is considered statistically significant.

In an embodiment, size of the first cluster is initially 1-10% of the size of the communication network.

In an embodiment, each allocation of the first and second clusters is valid for 5-10% of time.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which:

FIGS. 3 and 4 show flow diagrams illustrating example methods according to certain embodiments; and FIG. 5 shown an example confusion matrix.

DETAILED DESCRIPTION OF THE DRAWINGS

Example embodiments of the present disclosure and its potential advantages are understood by referring to FIGS. 1 through 5 of the drawings. In this document, like reference signs denote like parts or steps.

Example embodiments of the present disclosure provide a new approach to management of predictive models used in context of operating communication networks. The predictive model is configured to predict future-coming failures in network devices based on performance data and alerts received from the communication network. Embodiments of the present disclosure provide that periodic re-training and re-evaluation of the predictive model does not require fully stopping the use of the model. Instead the re-training and re-evaluation can be performed concurrently with using the model. In this way, the use of the model is maximized, while re-training and re-evaluation is also taken care of.

It is to be noted that in general management of one predictive model is discussed in the following, but clearly the discussed solutions can be used for concurrently managing a plurality of different predictive models.

The predictive models discussed in this disclosure may be based on machine learning algorithms and/or artificial intelligence.

Figure 1:
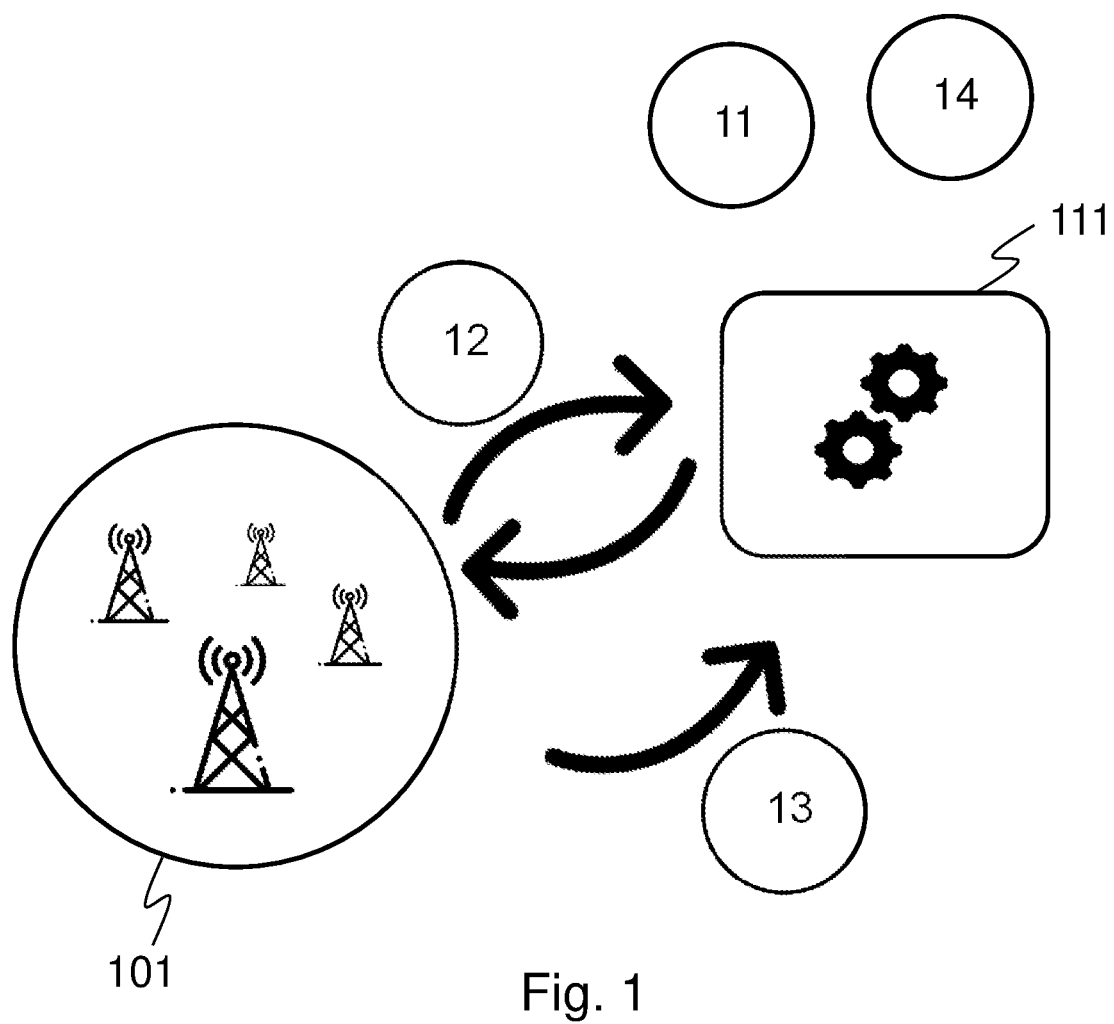
FIG. 1 shows an example scenario according to an embodiment.

FIG. 1 shows an example scenario according to an embodiment. The scenario shows a communication network 101 comprising a plurality of cells and base stations and other network devices, and an automation system 111 configured to implement management of a predictive model according to example embodiments.

In an embodiment of the present disclosure the scenario of FIG. 1 operates as follows: In phase 11, the automation system 111 allocates network devices of the communication network into first and second clusters. The clusters may be based on type of network device, technology of the network device supplier of the network device, time or geographical location of the network device or combinations of previous criteria. The predictive model is disabled in the first cluster and enabled in the second cluster. That is, failure corrections of the predictive model are performed in the second cluster but not in the first cluster. In phase 12, performance data and alerts are collected from the second cluster and based on the collected data the predictive model performs failure corrections in the second cluster. Performance data and alerts are collected also from the first cluster in phase 13, but the predictive model is not used for performing automatic failure corrections. In phase 14, at least the data collected from the first cluster is output for analysis of the predictive model. Additionally, the data that is output in phase 14 may comprise data collected from the second clusters and information on whether the predictive model was enabled or disabled in a given data set. Also information on the corrections made by the predictive model may be included. The analysis may be performed in the automation system 111 or in a logically or physically separate apparatus.

The process is continuously repeated to continuously change the allocation of the first and second cluster and to continuously collect data for the analysis of the predictive model. In this way, the predictive model is not continuously disabled in the same devices. Still further, by continuously repeating the process, management of the predictive model may automatically detect problems in performance of the predictive model and adapt to changes in the network (e.g. changes in network structure, network load and usage patterns). In an embodiment the allocation of the first and second clusters may be changed for example every day, every three days, once a week, or there may be some other repetition period.

In an embodiment the analysis of the predictive model is performed for data collected over a selected time period. The time period may be for example 1 week, 2 weeks, 1 month, 3 months, 12 months or some other period. With a shorter time period one achieves that it is possible to quickly adapt to changes in the network while longer time period provides more stable results with less noise.

Figure 2:
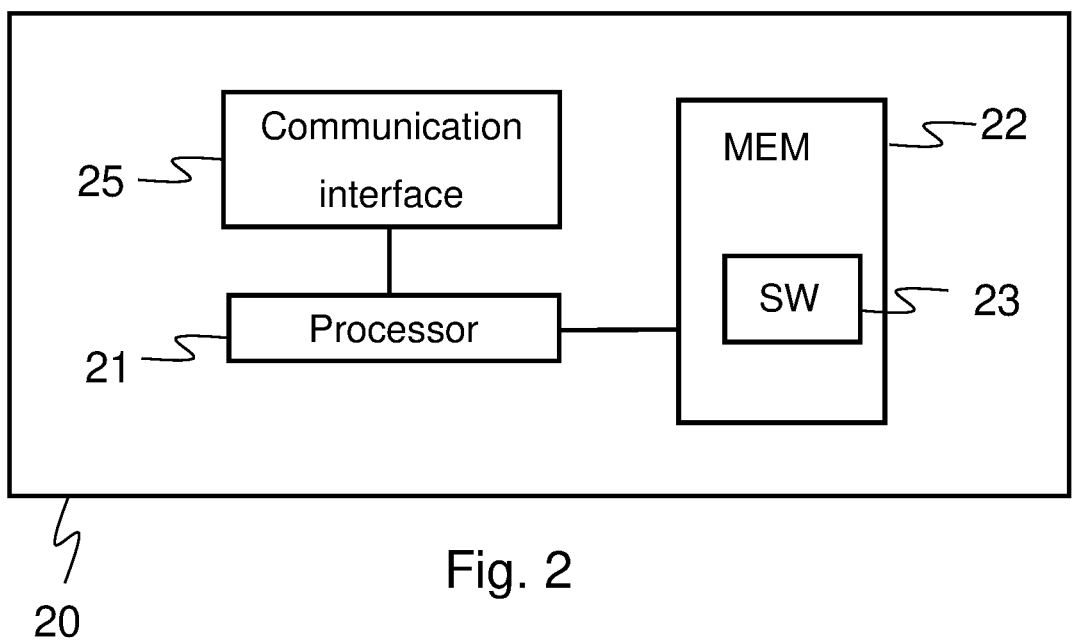
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3:
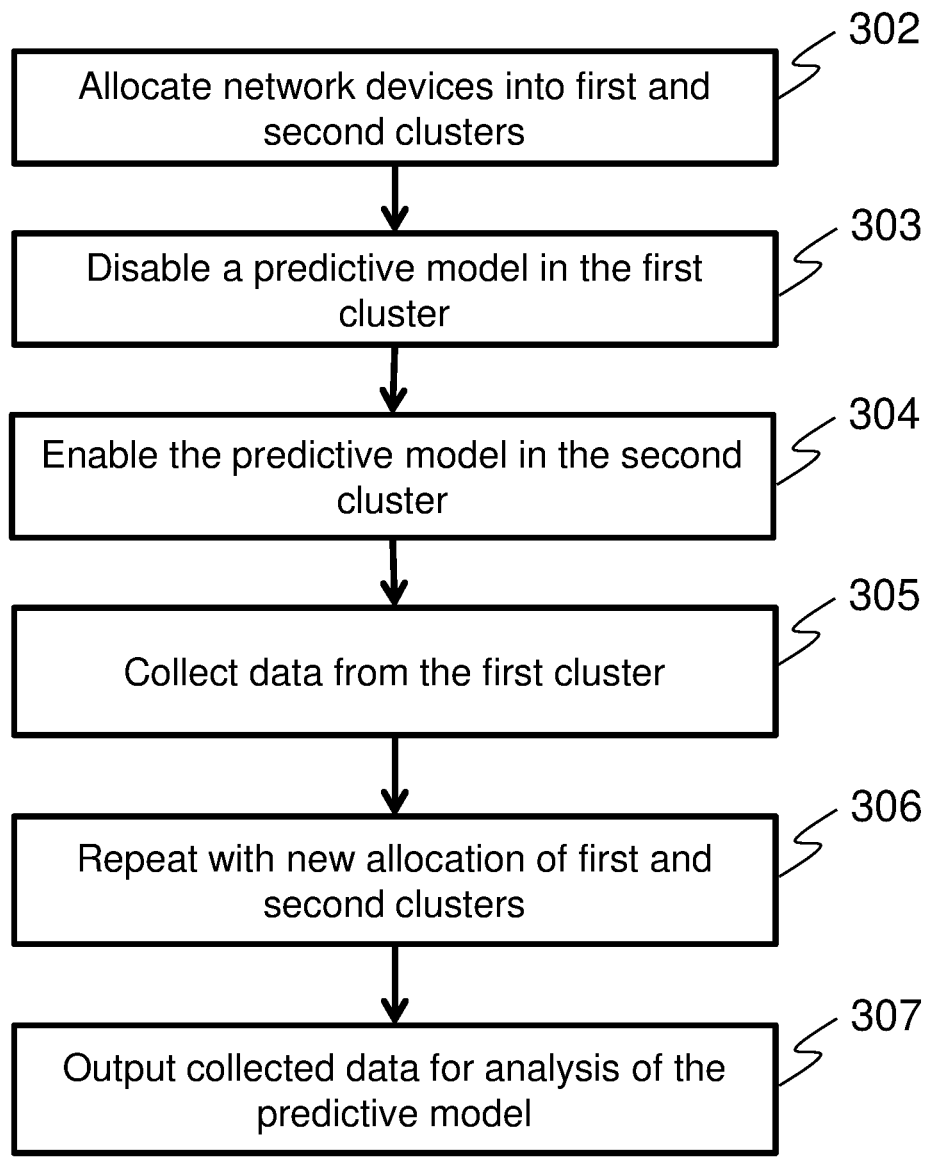

FIGS. 3 and 4 show flow diagrams illustrating example methods according to certain embodiments. The methods may be implemented for example in the automation system 111 of FIG. 1 and/or in the apparatus 20 of FIG. 2 and/or in a cloud computing environment. The methods are implemented in a computer and do not require human interaction unless otherwise expressly stated. It is to be noted that the methods may however provide output that may be further processed by humans and/or the methods may require user input to start. Different phases shown in FIGS. 3 and 4 may be combined with each other and the order of phases may be changed expect where otherwise explicitly defined. Furthermore, it is to be noted that performing all phases of the flow charts is not mandatory.

The method of FIG. 3 concerns managing a predictive model that is configured to identify and correct forthcoming failures in network devices of a communication network. The method comprises following phases:

Phase 302: Network devices of the communication network are allocated into first and second clusters. In general, the second cluster covers a larger part of the network and the first cluster covers a smaller part of the network. In an embodiment, the size of the first cluster is initially 1-10% of the size of the network and the second cluster covers the remaining part of the network. For example, 3%, 5% or 7% of the network devices may be allocated into the first cluster.

The allocation into the first and second clusters may be based on at least one of: type of the network devices, technology of the network devices (2G, 3G, 4G, 5G, ADSL, VDSL, FTTH, etc.), supplier of the network devices, time, and geographical locations of the network devices, and any combination of these.

Phase 303: The predictive model is disabled in the first cluster. That is, corrections of the predictive model are not performed in devices of the first cluster.

Phase 304: The predictive model is enabled in the second cluster. That is, corrections of the predictive model are performed in devices of the second cluster.

Phase 305: Data is collected from the first cluster. The collected data comprises information about performance and failures in the network devices. Data is collected also from the second cluster at least for the purpose of using the predictive model. Also data from the second clusters may be used in embodiments of the present disclosure. Furthermore, an indication on whether the predictive model was disabled or enabled in the respective device may be collected.

Phase 306: The phases 303-305 are repeated with a new allocation of first and second clusters. Repetition interval may be for example one day, three days, a week, 2 weeks, or there may be some other repetition period. In this way, results are continuously collected with different allocation of first and second clusters. That is, the predictive model is continuously used in large part of the network, but at the same time the predictive model is disabled in a smaller, constantly varying part of the network. In this way, it is possible to continuously use the predictive model while at the same time collecting comparative data from devices where the predictive model is not being used. In an embodiment each allocation of the first and second clusters is valid for example 5-10% or 3-15% of time. Some other alternative is also possible.

Phase 307: The collected results are output for analysis of the predictive model. In an embodiment the results that are output comprise at least data from the first cluster(s). Additionally, data from the second cluster(s) may be output.

The method of FIG. 4 concerns an example of analyzing the predictive model based on the collected results. The method of FIG. 4 comprises following phases:

Phase 401: Data from the first clusters is analyzed over time. It is to be noted that data is collected over time with varying allocation of first and second clusters. Data from the first clusters refer to data that do not involve use of the predictive model. Data from the second clusters refer to data that do involve the use of the predictive model.

In a general example, when creating machine learning based predictive models, first step is to gather historical data relevant to the event to be predicted. This historical data is then split into training and validation data sets, for example 70% of the historical data is allocated to the training data set and 30% of the historical data is allocated to the validation data set. The training data set is used in creating the predictive model (e.g. regression model, random forest, LSTM deep learning model). The trained model is used against the validation data set to determine various performance metrics of the predictive model. The performance metrics may be for example in the form of a confusion matrix (comprising true predictions, false predictions, missed predictions, true non-predictions). An example confusion matrix is discussed in more detail in connection with FIG. 5.

In an example embodiment, the analysis in phase 401 comprises comparing results of the predictive model applied to data collected from the first cluster with results of the predictive model applied to such validation data set. In this way, current performance metrics of the predictive model are compared to the initial performance metrics. That is, the current operation of the predictive model is compared to the initial situation when the predictive model was set up.

In another example embodiment, the analysis in phase 401 comprises comparing results of the predictive model applied to current data collected from the first cluster(s) with results of the predictive model applied to earlier data collected from the first cluster(s). In this way, changes in the performance of the predictive model over time can be detected.

In an embodiment, it is noted that the data used in the comparison may have been subject to actions suggested by the predictive model and therefore numbers of missed predictions and true non-predictions are taken into account in the comparison as numbers of true predictions and false predictions can be misleading.

Phase 402: If the analysis shows no deviation in results, that is expected results are obtained, the predictive model operates as intended. Insignificant deviation in results may be ignored. It is likely that this is true in many cases. In this case, the process continues to phase 410 to continue collection of data from first clusters e.g. as defined in phases of FIG. 3.

Phase 403: Alternatively, a deviation in results is detected. It may be noticed that there is an increase in false positives (or false predictions), that is, the predictive model identifies failures that would not have occurred. In such case the predictive model has resulted in performing unnecessary corrections. Alternatively or additionally, it may be noticed that there is an increase in false negatives (or missed predictions), that is, the predictive model fails to identify failures that occurred. In such case the predictive model has resulted in unnoticed failures.

Responsive to detection of the deviation, a management action is performed in phases 405-406.

Phase 405: In an embodiment, if a small, statistically insignificant deviation (for example less than 10-20%) is detected, the size of the first cluster is increased, and the process continues to phase 410 to continue collection of data from first clusters e.g. as defined in phases of FIG. 3. In this way more comparative data is being collected faster and further analysis of collected data may be performed to determine whether there is a significant deviation or not.

Phases 406 and 407: In certain embodiments, responsive to detecting a statistically significant deviation (for example more than 20%) retraining of the predictive model is performed.

In the alternative of phase 406, the retraining is performed based on the data collected from the first clusters, and the process concurrently continues to phase 410 to continue collection of data from first clusters e.g. as defined in phases of FIG. 3. This may be performed for example responsive to detecting an increase in false negatives (or missed predictions) in the predictive model, i.e. that the predictive model is not detecting all failures. In such case it may be possible to continue using the predictive model for the duration of retraining the model.

In the alternative of phase 407, the predictive model is fully disabled in all network devices before retraining the predictive model. This may be performed for example responsive to detecting an increase in false positives (or false predictions) in the predictive model, i.e. that the predictive model is detecting too may failures and making unnecessary corrections. In such case it may be better to fully stop using the predictive model for the duration of retraining the model.

FIG. 5 shows an example confusion matrix 501. The analysis of the data from the first clusters e.g. in phase 401 of FIG. 4 may be implemented for example by means of comparison of confusion matrixes determined based on current data and earlier data. Alternatively or additionally, the analysis may be implemented by means of comparison of a confusion matrix determined based on current data and a confusion matrix determined based on a validation data set.

Upper left-hand corner of the matrix shows number of true positives or true predictions (9000 in this example), that is, failures that have been identified and corrected by the predictive model and that would have actually occurred. Upper right-hand corner of the matrix shows number of false positives or false predictions (3000 in this example), that is, failures that have been predicted and corrected by the predictive model but that would not have actually occurred. Lower left-hand corner of the matrix shows number of false negatives or missed predictions (1000 in this example), that is, cases where the predictive model does not identify a failure, but where a failure actually occurs. Lower right-hand corner of the matrix shows number of true negatives or true non-predictions (300 000 in this example), that is, cases where the predictive model does not identify a failure and where a failure does not occur.

In an embodiment, an increase in number of cases in upper right-hand (false positives) and/or lower left-hand corner (false negatives) is determined to indicate model drift and result in retraining the predictive model. The increase may be gradual and/or a significant increase may be required before performing the retraining. More sudden changes in the numbers may indicate systematic changes in network, such as changes in network equipment software versions or changes in configuration parameters.

Without in any way limiting the scope, interpretation, or application of the claims appearing below, a technical effect of one or more of the example embodiments disclosed herein is ability to continuously use predictive models in communication networks while at the same time evaluating operation of the predictive models. In this way maximum benefit may be obtained from the use of predictive models.

Another technical effect of one or more of the example embodiments disclosed herein is that performance of the predictive models can be continuously evaluated and thereby model drift, if any, can be detected in a timely manner.

If desired, the different functions discussed herein may be performed in a different order and/or concurrently with each other. Furthermore, if desired, one or more of the before-described functions may be optional or may be combined.

Although various aspects of the present disclosure are set out in the independent claims, other aspects of the present disclosure comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of managing a predictive model of a communication network, wherein the predictive model is configured to identify and correct forthcoming failures in network devices based on data collected from the network devices, the method comprising:
    allocating network devices of the communication network into first and second clusters,
    disabling the predictive model in the first cluster,
    enabling the predictive model in the second cluster,
    collecting data from the first cluster,
    repeating said disabling, enabling and collecting with a new allocation of first and second clusters to continuously collect data with different allocation of first and second clusters, and
    outputting at least the data collected from the first cluster for analysis of the predictive model, wherein the method further comprises analyzing the predictive model based on the data collected from the first cluster over time, the analyzing comprising comparing results of the predictive model applied to the data collected from the first cluster with results of the predictive model applied to a validation data set.

2. The method of claim 1, wherein allocation into the first and second clusters is based on at least one of: type of the network devices, technology of the network devices, supplier of the network devices, time, and geographical locations of the network devices.

3. The method of claim 1, further comprising collecting data from the second cluster and applying the predictive model to the data collected from the second cluster to identify and correct failures in network devices of the second cluster.

4. The method of claim 1, further comprising, responsive to detecting deviation from expected results in said analyzing, performing a management action.

5. The method of claim 4, wherein the management action comprises one of the following:

increasing size of the first cluster, and continuing collection of the data from the first clusters,
retraining the predictive model,
retraining the predictive model based on the data collected from the first clusters, and continuing collection of the results from first clusters, and
disabling the predictive model in all network devices, and retraining the predictive model.

6. The method of claim 5, wherein a statistically significant deviation is required for retraining the predictive model.

7. The method of claim 6, wherein at least 20% deviation is considered statistically significant.

8. The method of claim 4, wherein the deviation is an increase in false negatives in the predictive model, and the responsive management action is retraining the predictive model based on the data collected from the first clusters, and continuing collection of the results from first clusters.

9. The method of claim 4, wherein the deviation is an increase in false positives in the predictive model, and the responsive management action is disabling the predictive model in all network devices, and retraining the predictive model.

10. The method of claim 1, wherein size of the first cluster is initially 1-10% of the size of the communication network.

11. The method of claim 1, wherein each allocation of the first and second clusters is valid for 5-10% of time.

12. An apparatus comprising
a processor, and
a memory including computer program code; the memory and the computer program code configured to, with the processor, cause the apparatus to manage a predictive model of a communication network, wherein the predictive model is configured to identify and correct forthcoming failures in network devices based on data collected from the network devices, by
allocating network devices of the communication network into first and second clusters,
disabling the predictive model in the first cluster,
enabling the predictive model in the second cluster,
collecting data from the first cluster,
repeating said disabling, enabling and collecting with a new allocation of first and second clusters to continuously collect data with different allocation of first and second clusters,
outputting at least the data collected from the first cluster for analysis of the predictive model based on the data collected from the first cluster over time, wherein the analysis comprises comparing results of the predictive model applied to the data collected from the first cluster with results of the predictive model applied to a validation data set.

13. A computer program product stored on a non-transitory memory medium, wherein the computer program product comprises computer executable program code which when executed by a processor causes an apparatus to manage a predictive model of a communication network, wherein the predictive model is configured to identify and correct forthcoming failures in network devices based on data collected from the network devices, by
allocating network devices of the communication network into first and second clusters,
disabling the predictive model in the first cluster,
enabling the predictive model in the second cluster,
collecting data from the first cluster,
repeating said disabling, enabling and collecting with a new allocation of first and second clusters to continuously collect data with different allocation of first and second clusters, and
outputting at least the data collected from the first cluster for analysis of the predictive model based on the data collected from the first cluster over time, wherein the analysis comprises comparing results of the predictive model applied to the data collected from the first cluster with results of the predictive model applied to a validation data set.

* * * * *